United States Patent
Itoh (10) Patent No.: US 10,621,460 B2
(45) Date of Patent: Apr. 14, 2020

(54) IMAGE PROCESSING APPARATUS, METHOD FOR CONTROLLING THE SAME, AND COMPUTER-READABLE STORAGE MEDIUM

(71) Applicant: CANON KABUSHIKI KAISHA, Tokyo (JP)

(72) Inventor: Jun Itoh, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 137 days.

(21) Appl. No.: 15/688,101

(22) Filed: Aug. 28, 2017

(65) Prior Publication Data

US 2018/0068199 A1 Mar. 8, 2018

(30) Foreign Application Priority Data

Sep. 7, 2016 (JP) .................................. 2016-174965

(51) Int. Cl.
*G06K 9/38* (2006.01)
*H04N 1/403* (2006.01)
(Continued)

(52) U.S. Cl.
CPC ............... *G06K 9/38* (2013.01); *G06T 5/009* (2013.01); *G06T 5/40* (2013.01); *G06T 7/11* (2017.01);
(Continued)

(58) Field of Classification Search
CPC ............ G06K 9/38; G06K 9/00; H04N 1/403; H04N 1/4074; H04N 1/40012; G06T 7/11;
(Continued)

(56) References Cited

U.S. PATENT DOCUMENTS 5,416,605 A * 5/1995 Hideshima ........... G03B 21/118
353/26 A
5,657,135 A * 8/1997 Hashimoto .......... G03B 21/118
358/296
(Continued)

FOREIGN PATENT DOCUMENTS

CN 1335581 2/2002
CN 1622589 6/2005
(Continued)

OTHER PUBLICATIONS

Chinese Office Action dated May 8, 2019 issued in counterpart Chinese application No. 20170790939.6 (whole English translation included).

*Primary Examiner* — Phuoc Tran
(74) *Attorney, Agent, or Firm* — Venable LLP (57) ABSTRACT

An image processing apparatus according to this embodiment performs, based on a job setting, conversion of a pixel value of a partial region in an input original image into a predetermined value on image data of the original image, as needed. Subsequently, this image processing apparatus generates a histogram representing the density signal distribution of the image data of the original image or the converted image data. Note that if the above-described conversion is performed, this image processing apparatus corrects the generated histogram by subtracting, from a count of the predetermined number of the generated histogram, the number of sampling points counted in the above-described partial region when the histogram is generated.

18 Claims, 5 Drawing Sheets

(51) Int. Cl.
  *G06T 7/11* (2017.01)
  *G06T 5/00* (2006.01)
  *G06T 7/136* (2017.01)
  *G06T 5/40* (2006.01)
  *H04N 1/40* (2006.01)
  *H04N 1/407* (2006.01)

(52) U.S. Cl.
  CPC ............ *G06T 7/136* (2017.01); *H04N 1/403* (2013.01); *H04N 1/40012* (2013.01); *H04N 1/4074* (2013.01); *G06T 2207/10008* (2013.01); *G06T 2207/30176* (2013.01)

(58) Field of Classification Search
  CPC ........... G06T 5/009; G06T 5/40; G06T 7/136; G06T 2207/10008; G06T 2207/30176
  See application file for complete search history.

(56) References Cited

U.S. PATENT DOCUMENTS

| | | | |
|---|---|---|---|
| 10,083,364 B2 * | 9/2018 | Yanagiuchi | B41J 29/46 |
| 2002/0085243 A1 * | 7/2002 | Kanatsu | H04N 1/56 358/453 |

FOREIGN PATENT DOCUMENTS

| | | |
|---|---|---|
| JP | S63-262965 | 10/1988 |
| JP | H02-156772 | 6/1990 |
| JP | 2003-108997 | 4/2003 |
| JP | 2014-107589 | 6/2014 |

\* cited by examiner

IMAGE PROCESSING APPARATUS, METHOD FOR CONTROLLING THE SAME, AND COMPUTER-READABLE STORAGE MEDIUM

BACKGROUND OF THE INVENTION

Field of the Invention

The present invention relates to an image processing apparatus that binarizes image data, a method for controlling the same, and a computer-readable storage medium.

Description of the Related Art

An image processing apparatus executes binarization processing to process and convert input color or grayscale image data into a monochrome binary image. If a threshold is calculated automatically from an input image, and an image is binarized using the calculated threshold, a content included in the image may be lost depending on the density distribution of the input image. To cope with this, Japanese Patent Laid-Open No. 2014-107589 proposes a technique of analyzing a histogram representing the density signal distribution of image data, determining a threshold to be applied to threshold processing, and performing binarization suitable for the density distribution of an input image.

However, the above-described related art has a problem to be described below. A histogram used to automatically calculate the threshold for binarizing the image in the threshold processing represents the density distribution of an entire input image. On the other hand, if frame erasing processing is designated for the input image, the histogram indicates the density distribution for the entire image after the frame erasing processing. In this case, even if the input image is the same image, the histogram changes under the influence of a white image in a frame erasing region, an appropriate threshold for the input image cannot be calculated, and the content included in the image may be lost.

SUMMARY OF THE INVENTION

The present invention enables realization of a mechanism for generating a histogram that represents the density signal distribution of image data in an input image, determining a threshold in threshold processing, and performing binarization regardless of whether the input image is corrected by frame erasing or the like.

One aspect of the present invention provides an image processing apparatus comprising: a memory device that stores a set of instructions; and at least one processor that executes the instructions to: performs conversion, on image data of an input original image, of a pixel value of a partial region in the original image into a predetermined value; generate a histogram representing a density signal distribution of the converted image data; correct the generated histogram by subtracting, from a count of the predetermined value of the generated histogram, the number of sampling points counted in the partial region when the histogram is generated; determine, from the corrected histogram, a threshold when binarization processing is executed; and binarize the original image by using the determined threshold.

Another aspect of the present invention provides an image processing apparatus comprising: a memory device that stores a set of instructions; and at least one processor that executes the instructions to: performs conversion, on image data of an input original image, of a pixel value of a partial region in the original image into a predetermined value; generate a histogram representing a density signal distribution of the converted image data by using a plurality of pixel values except for the partial region; determine, from the generated histogram, a threshold when binarization processing is executed; and binarize the original image by using the determined threshold.

Still another aspect of the present invention provides a method for controlling an image processing apparatus, the method comprising: performing conversion, on image data of an input original image, of a pixel value of a partial region in the original image into a predetermined value; generating a histogram representing a density signal distribution of the image data converted in the converting; correcting the generated histogram by subtracting, from a count of the predetermined value of the generated histogram, the number of sampling points counted in the partial region when the histogram is generated; determining, from the corrected histogram, a threshold when binarization processing is executed; and binarizing the original image by using the determined threshold.

Yet still another aspect of the present invention provides a method for controlling an image processing apparatus, the method comprising: performing conversion, on image data of an input original image, of a pixel value of a partial region in the original image into a predetermined value; generating a histogram representing a density signal distribution of the converted image data by using a plurality of pixel values except for the partial region; determining, from the generated histogram, a threshold when binarization processing is executed; and binarizing the original image by using the determined threshold.

Still yet another aspect of the present invention provides a non-transitory computer-readable storage medium storing a computer program for causing a computer to execute respective steps in a method for controlling an image processing apparatus, the method comprising: performing conversion, on image data of an input original image, of a pixel value of a partial region in the original image into a predetermined value; generating a histogram representing a density signal distribution of the converted image data; correcting the generated histogram by subtracting, from a count of the predetermined value of the generated histogram, the number of sampling points counted in the partial region when the histogram is generated; determining, from the corrected histogram, a threshold when binarization processing is executed; and binarizing the original image by using the determined threshold.

Yet still another aspect of the present invention provides a non-transitory computer-readable storage medium storing a computer program for causing a computer to execute respective steps in a method for controlling an image processing apparatus, the method comprising: performing conversion, on image data of an input original image, of a pixel value of a partial region in the original image into a predetermined value; generating a histogram representing a density signal distribution of the converted image data by using a plurality of pixel values except for the partial region; determining, from the generated histogram, a threshold when binarization processing is executed; and binarizing the original image by using the determined threshold.

Still yet another aspect of the present invention provides an image processing apparatus comprising: a memory device that stores a set of instructions; and at least one processor that executes the instructions to: set first processing to convert a partial region of image data into white;

performs the first processing set by a setting unit on first image data obtained by reading an original with a scanner to generate second image data; generate information used for second processing by using a pixel value in a region except for the region converted into white by the first processing; and perform the second processing on the second image data by using the generated information.

Yet still another aspect of the present invention provides a method for controlling an image processing apparatus, the method comprising: setting first processing to convert a partial region of image data into white; performing the first processing set by a setting unit on first image data obtained by reading an original with a scanner to generate second image data; generating information used for second processing by using a pixel value in a region except for the region converted into white by the first processing; and performing the second processing on the second image data by using the generated information.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Arrangement of Image Processing Apparatus

The first embodiment of the present invention will be described below. First, the system arrangement of an image processing apparatus according to this embodiment will be described with reference to FIG. 1.

Figure 1:
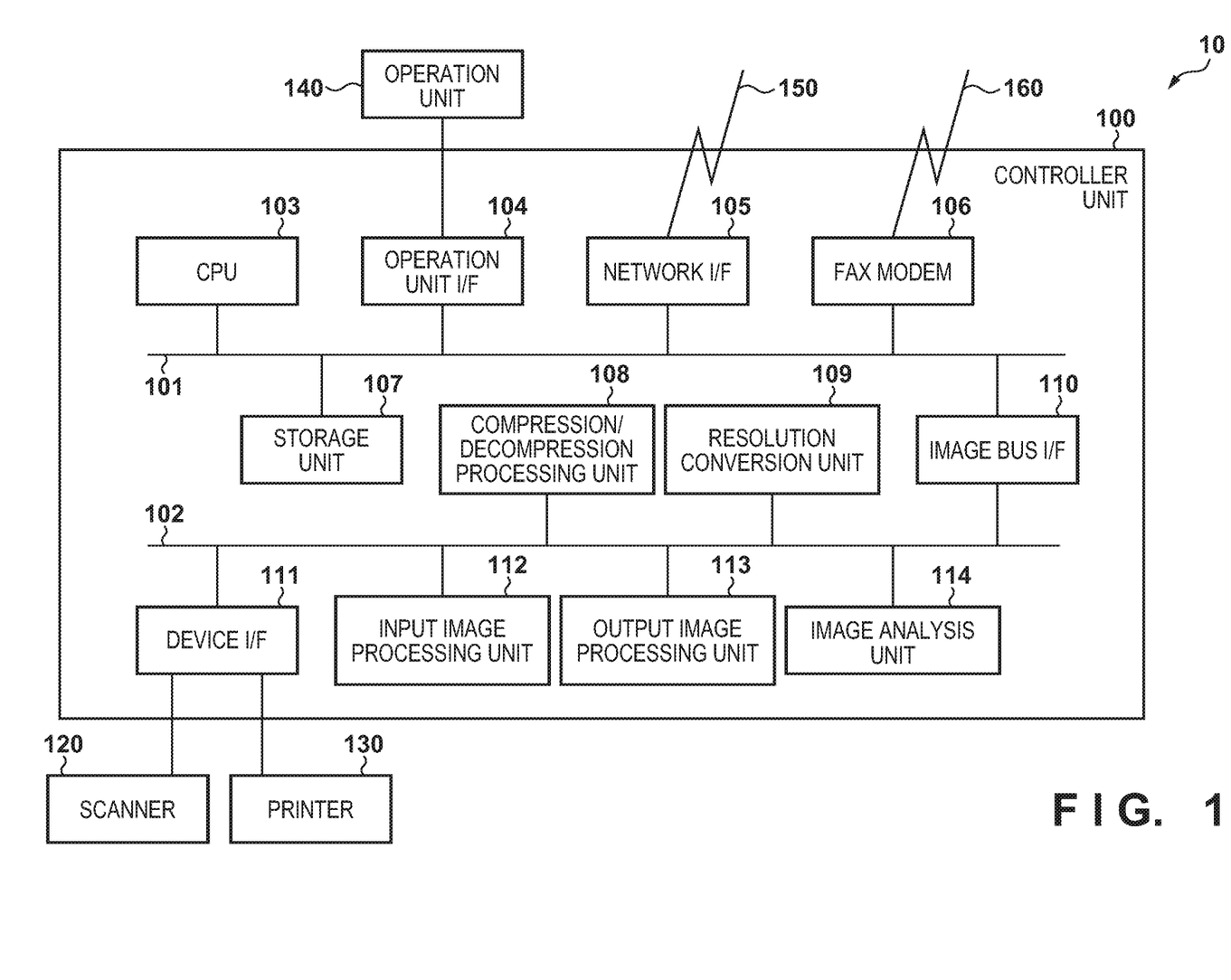
FIG. 1 is a block diagram showing the arrangement of an image processing apparatus such as a digital multi-function peripheral according to an embodiment.

An image processing apparatus 10 includes a controller unit 100, a scanner 120, a printer 130, and an operation unit 140. The controller unit 100 includes a CPU 103, an operation unit I/F 104, a network I/F 105, a FAX modem 106, a storage unit 107, and an image bus I/F 110. These components are arranged on a system bus 101 and can perform data communication mutually. The controller unit 100 also includes a compression/decompression processing unit 108, a resolution conversion unit 109, a device I/F 111, an input image processing unit 112, an output image processing unit 113, and an image analysis unit 114. These components and the above-described image bus I/F 110 are arranged on an image bus 102, and can perform data communication mutually.

The controller unit 100 is connected to the scanner 120 serving as an image input apparatus and the printer 130 serving as an image output apparatus while being connected to a LAN 150 and a public line 160, inputs/outputs image data and device information, and controls an overall system. The CPU 103 functions as a controller that generally controls the image processing apparatus 10. The operation unit I/F 104 is an interface unit with the operation unit 140 and outputs, to the operation unit 140, image data to be displayed in a display unit (not shown) on the operation unit 140. The operation unit I/F 104 also plays a role of passing information input by a user from the operation unit 140 to the CPU 103.

The network I/F 105 is connected to the LAN 150 and inputs/outputs data. The FAX modem 106 is connected to the public line 160 and performs modulation/demodulation processing for data transmission/reception. The storage unit 107 is configured to store image data or compressed data and also includes a system work memory or the like to be operated by the CPU 103.

The image bus I/F 110 serves as a bus bridge that connects the system bus 101 and the image bus 102 transferring image data at high speed, and converts a data structure. The image bus 102 is formed by a high-speed bus such as a PCI Express bus. The compression/decompression processing unit 108 compresses/decompresses image data by a predetermined compression method. The resolution conversion unit 109 enlarges or reduces image data. The device I/F 111 connects the controller unit 100, and the scanner 120 and printer 130 serving as the image input/output apparatuses and performs synchronous/asynchronous conversion of image data.

The input image processing unit 112 mainly corrects, processes, and edits image data obtained by the scanner 120 and performs conversion processing corresponding to subsequent various types of processing. The output image processing unit 113 mainly performs, on image data, correction and conversion into a data format for outputting it by the printer 130. The image analysis unit 114 analyzes input image to obtain information needed for correction, process, and edit processing or generate a coefficient to be applied to subsequent image processing.

The scanner 120 functions as a reading unit, irradiates an original with light, reads reflected light therefrom by a light receiving element such as a CMOS line sensor, converts it into an electrical signal representing an image on the original, and generates digital image data. The printer 130 forms and outputs image data as an image on a paper sheet. The printer 130 can use any one of an electrophotographic method, an inkjet method, and the like.

Binarization Processing

Figure 2:
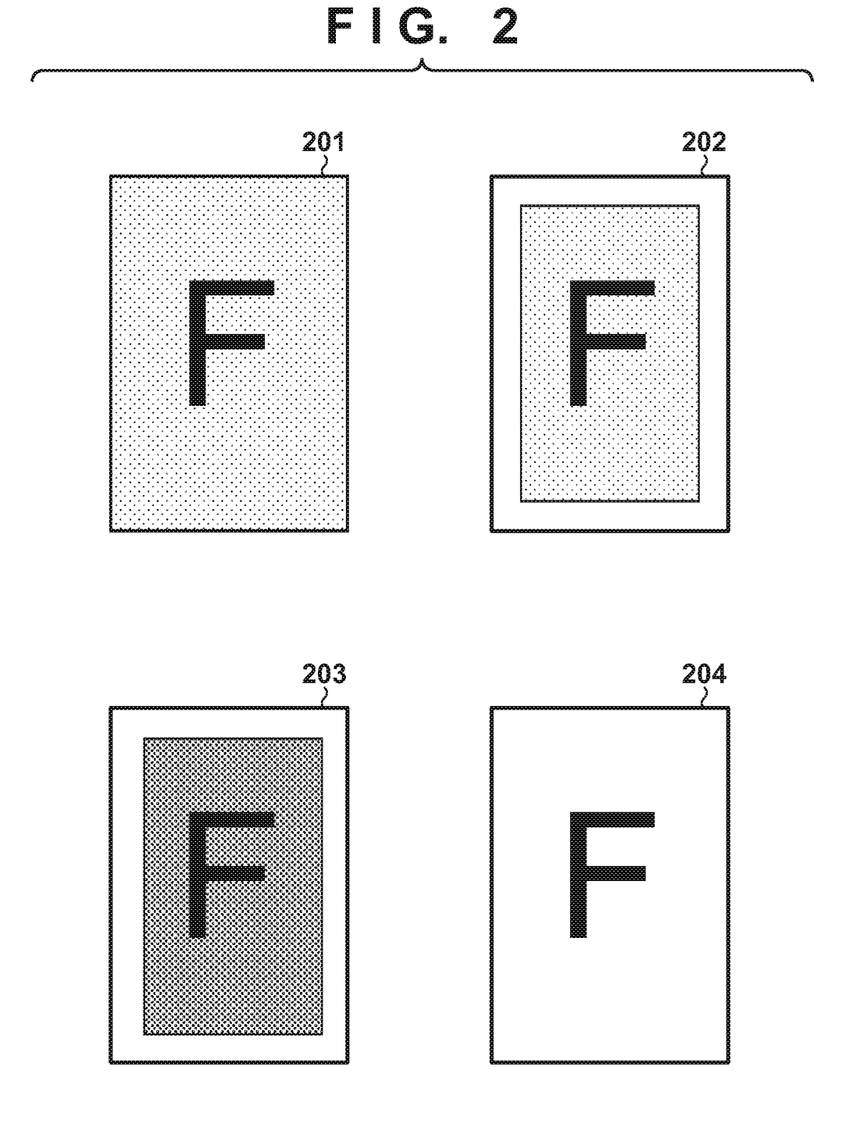
FIG. 2 shows views of examples of output images according to the embodiment.

Binarization processing according to this embodiment will now be described with reference to FIG. 2. An original image 201 indicates a state in which a letter "F" darker than a gray background is drawn on the background. Binarization processing is executed on the original image 201 by applying a threshold calculated from a histogram thereof, obtaining a binary image 204 that is a black-and-white (monochrome) binarized image from which the gray background is removed.

On the other hand, binarization processing is executed, by applying the threshold calculated from the histogram in the same manner, on an image 202 obtained by performing frame erasing processing on the surrounding of the original image 201, obtaining an image 203. The image 203 is an example of an image where a threshold at which the gray background is turned into black by the binarization processing is calculated, binarizing both the gray background and the letter into black, and reducing readability of the letter. This is because the histogram used to calculate the threshold changes by the frame erasing processing, making it impossible to calculate a correct threshold even though the original image is the same. To cope with this, a method capable of generating the same image as the image obtained by executing the binarization processing on the original image 201 even if the binarization processing is executed on the image 202 obtained by making correction such as the frame erasing processing on the original image will be described in this embodiment.

Determination of Threshold

Figure 4:
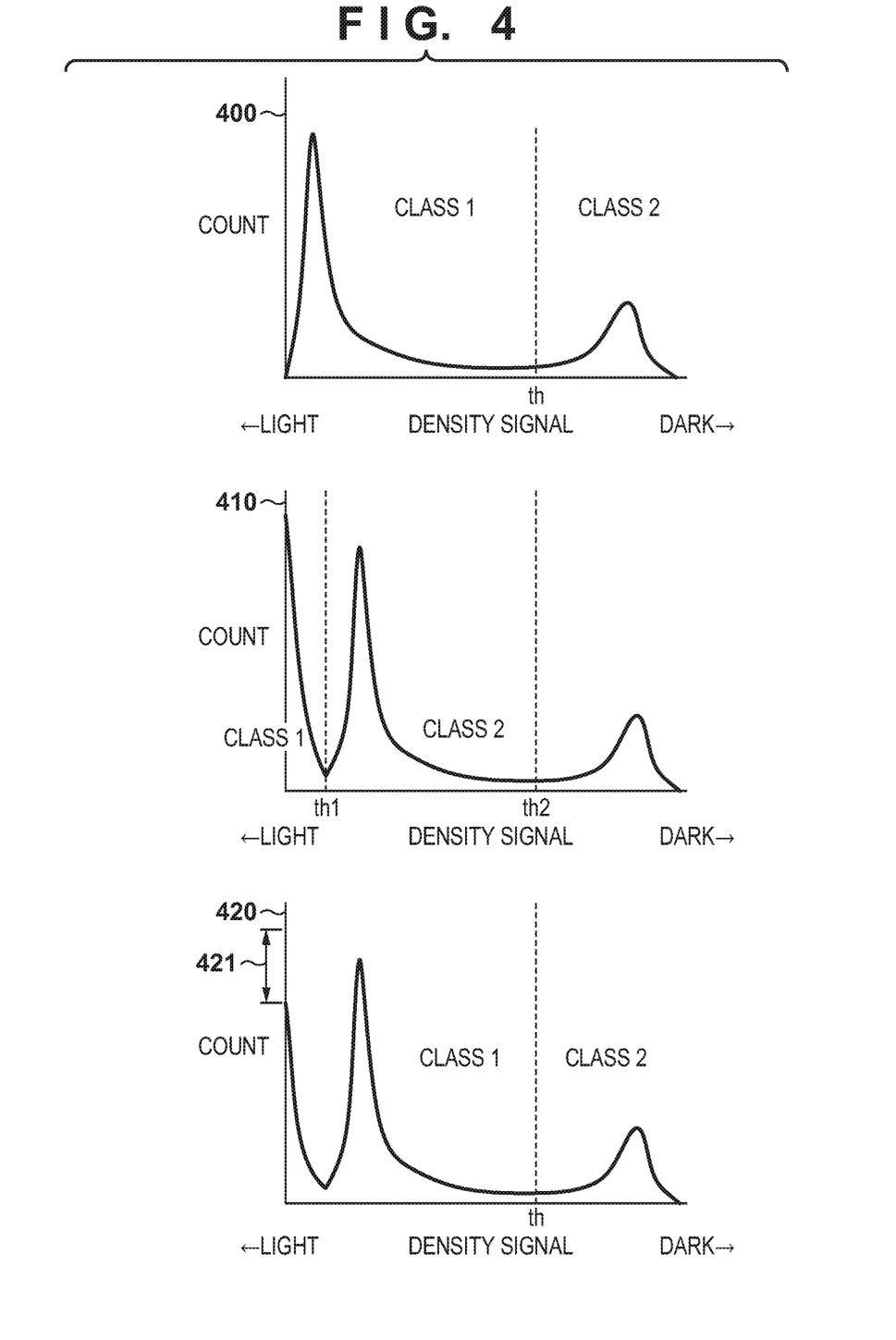
FIG. 4 shows graphs of examples of histograms for explaining a threshold determination method according to the embodiment.

A method for determining, from each histogram, a threshold for black-and-white (monochrome) binarization processing will now be described with reference to FIG. 4. Discriminant analysis is given as one of well-known methods of obtaining, by using a histogram, a threshold suitable for the density distribution of an image. In the discriminant analysis, when a histogram is divided into two classes at a certain signal value (pixel value), a signal value corresponding to a maximum inter-class variance value is determined as a threshold. A graph 400 indicates the typical shape of a histogram suitable for this method. The abscissa indicates the density signal of image data, and the ordinate indicates a count. The graph 400 is the histogram for the original image 201. If an image has such a histogram, a maximum inter-class variance value is obtained when the histogram is divided into two classes at illustrated th, and th is determined as a threshold. The image that has undergone the binarization processing by this threshold becomes an image indicating the above-described binary image 204.

On the other hand, reference numeral 410 indicates an example in a case in which the discriminant analysis is applied to the histogram generated from an image that has undergone frame erasing processing. This is a histogram for the image 202 obtained by applying the frame erasing processing to the original image 201. Note that depending on the size of a region whose frame is erased from the original image, there exists a case in which a white image indicating a frame erasing region marks the peak of the histogram as indicated by reference numeral 410. In this case, not a threshold th2 as a naturally desirable threshold but a threshold th1 is determined as a threshold corresponding to a maximum inter-class variance value. If the black-and-white binarization processing is performed by applying this threshold th2, binarization processing into black is performed on the gray background of the image 202 indicated as a signal value between the threshold th1 and the threshold th2 in the histogram, generating the image 203. Consequently, a background image and the letter are binarized into the same color, that is, black, greatly reducing the readability of the letter.

To cope with this, in this embodiment, a histogram 420 is generated by correcting an influence on the histogram 410 caused by counting the white image in the frame erasing region. A detailed generation method will be described later with reference to FIG. 3. This makes it possible to perform processing such that the naturally desirable threshold th is calculated for the histogram of the image 202 to which the frame erasing processing is applied.

Processing Procedure

A processing procedure in which a black-and-white binary image is generated according to this embodiment will now be described with reference to FIG. 3. Black-and-white binary image generation processing performed by the image processing apparatus 10 on image data obtained by reading an original with the scanner 120 in this embodiment will be described here. Processing to be described below is implemented by causing the CPU 103 to execute a control program stored in the storage unit 107.

In step S301, the CPU 103 obtains a job setting instructed from the user via the operation unit 140. The job setting here is designation of, for example, scaling such as enlargement/reduction, original frame erasing, movement, a reading size, or the like regarding original reading. Subsequently, in step S302, the CPU 103 determines coordinates at which a density value in the image data read with the scanner 120 is sampled in order to generate a histogram from the image data. The coordinates (to be referred to as sampling points hereinafter) at which the density value is sampled will now be described with reference to FIG. 5.

Figure 5:
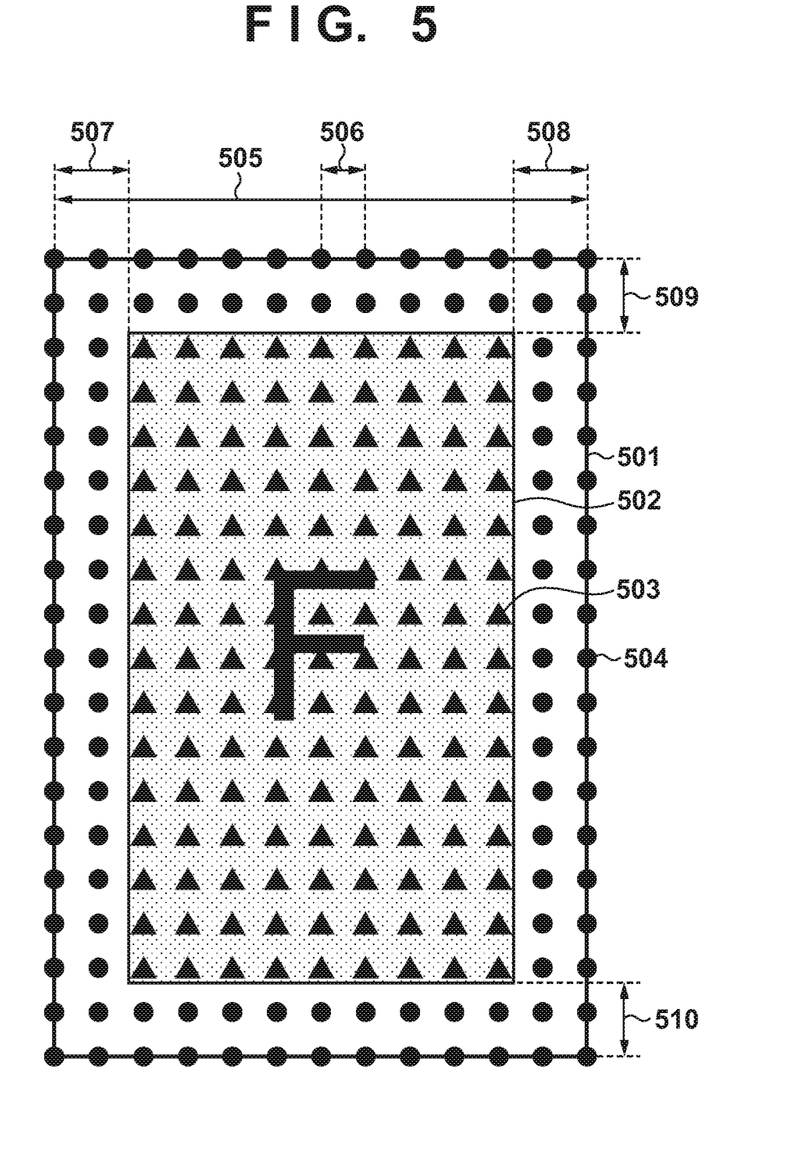
FIG. 5 is a view showing an example for explaining sampling points of a histogram according to the embodiment.

FIG. 5 shows sampling points for image data obtained by reading an original corresponding to the image 202 with the scanner 120. Reference numeral 501 of FIG. 5 indicates image data obtained by reading the original. Each sampling point is determined such that at least the predetermined number (N) of sampling operations is performed regardless of an image size in both main scanning and sub scanning of an image. Note that in this embodiment, assuming N=256, a histogram is generated from at least 256×256=65536 density values in an entire image.

It is desirable that the sampling operations are set at regular intervals for the image data. Therefore, letting a length of the image data in a sub-scanning direction Y (pixel) be 505 of FIG. 5, the CPU 103 obtains a value of reference numeral 506 as a sampling point interval Y_Pitch (pixel) by:

$$Y\_Pitch = Y/256$$

Consequently, setting the upper left of the image as an origin, the sampling point in the sub-scanning direction is determined as a coordinate for each sampling point interval Y_Pitch. As in a main scanning direction, the sampling points are determined by:

$$X\_Pitch = X/256$$

Reference numerals 503 and 504 of FIG. 5 indicate determined sampling points. The sampling point 503 is a point outside a region whose frame is erased in original frame erasing processing. The sampling point 504 is a point in a region whose frame is erased. Accordingly, reference numeral 507 indicates BlankT as a frame erasing region at a leading edge in sub scanning, and reference numeral 508 indicates BlankB as a frame erasing region at a trailing edge in sub scanning. Reference numeral 509 indicates BlankL as a frame erasing region at a leading edge in main scanning, and reference numeral 510 indicates BlankR as a frame erasing region at a trailing edge in main scanning.

Figure 3:
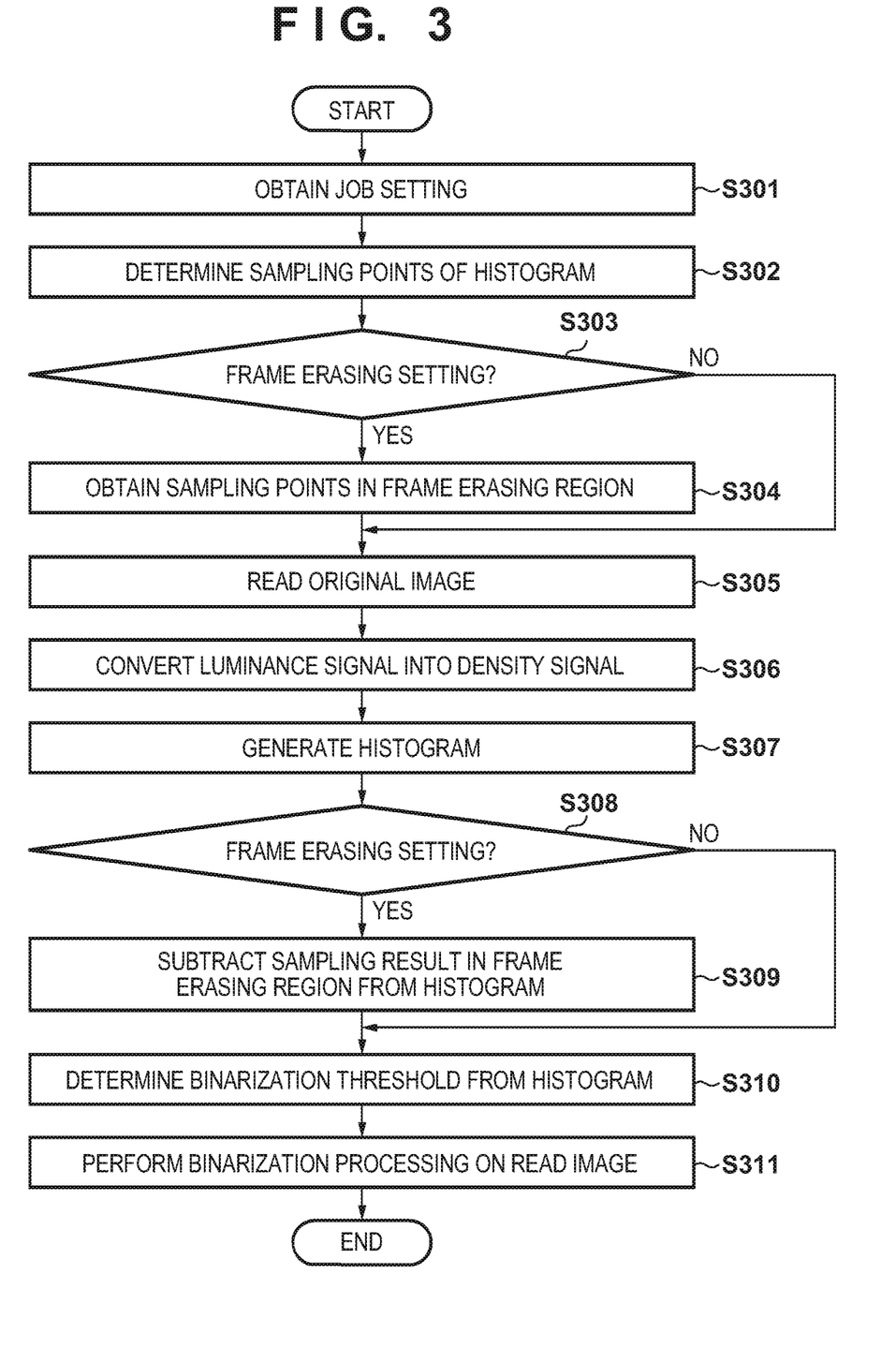
FIG. 3 is a flowchart showing the sequence of black-and-white binary image generation processing according to the embodiment.

Returning to the description of FIG. 3, in step S303, the CPU 103 judges whether a setting that converts a part of the image data into white image data such as original frame erasing is performed on the image data obtained by reading the original in the job setting obtained in step S301. If the setting is performed, the process advances to step S304; otherwise, the process advances to step S305.

If the job setting of original frame erasing is performed, a histogram generated from the image data may be different from a histogram generated when original frame erasing is not set. This is because generation of the histogram in this embodiment is executed on image data after original frame erasing. In this embodiment, the input image processing unit 112 performs original frame erasing processing when the original is read, and then a histogram is generated in accordance with the sampling points determined in step S302 in the image analysis unit 114. That is, an image input to the image analysis unit 114 is data on which the input image processing unit 112 has already performed the original frame erasing processing. Therefore, according to this embodiment, the following control is performed to be the same as a case in which a histogram is generated from the original image even if the job setting of original frame erasing is performed.

In step S304, the CPU 103 obtains the number of sampling points present in a region whose frame is erased out of the sampling points determined in step S302. Out of the sampling points shown in FIG. 5, the sampling point 504 indicated by a circle corresponds to this. Note that the number Nm (504) of sampling points present in the region whose frame is erased will be obtained as follows.

First, let X and Y (505) be the image sizes (pixel), X_Pitch and Y_Pitch (506) be the sampling point intervals (pixel), and Nx and Ny be the numbers of sampling points of the image data in the main scanning direction and the sub-scanning direction. The numbers of sampling points of the image data in the main scanning direction and the sub-scanning direction are, respectively, obtained by:

$Nx=X/X\_Pitch+1$ $Ny=Y/Y\_Pitch+1$

Note that let BlankT (507) at a sub-scanning leading edge, BlankB (508) at a sub-scanning trailing edge, BlankL (509) at a main scanning leading edge, and BlankR (510) at a main scanning trailing edge be frame erasing sizes (pixel) of original frame erasing designated in the job setting. In contrast, the numbers Nt, Nb, Nl, and Nr of sampling points with respect to respective frame erasing widths are obtained by:

$Nt=(BlankT/Y\_Pitch+1)$ $Nb=Ny-((Y-BlankB)/Y\_Pitch+1)$ $Nl=(BlankL/X\_Pitch+1)$ $Nr=Nx-((X-BlankR)/X\_Pitch+1)$ Consequently, the number Nm (504) of sampling points present in the region whose frame is erased is obtained by:

$Nm=Nt \times Nx+Nb \times Nx+Nl \times Ny+Nr \times Ny-Nt \times Nl-Nt \times Nr-Nb \times Nl-Nb \times Nr$ On the other hand, if it is judged in step S303 that original frame erasing is not set for the job setting, the CPU 103 advances the process to step S305 without executing the process in step S304.

In step S305, the CPU 103 executes a process of reading the original with the scanner 120. In step S306, the CPU 103 causes the input image processing unit 112 to perform conversion processing from a luminance signal into a density signal on the image data of the read original. Subsequently, in step S307, the CPU 103 causes the image analysis unit 114 to generate, from the image data, a histogram indicating the density distribution of an image.

Then, in step S308, the CPU 103 judges, as in step S303, whether the setting that converts a part of the image data into white image data such as original frame erasing is performed on the image data obtained by reading the original in the job setting obtained in step S301. If the setting is performed, the process advances to step S309; otherwise, the process advances to step S310.

In step S309, the CPU 103 subtracts the number Nm (504) of sampling points present in the frame erasing region calculated in step S304 from a count value indicating the white image of the histogram generated in step S307. Then, the process advances to step S310. This implements a process of correcting the histogram of the shape indicated by 410 to the shape of 420. More specifically, the CPU 103 subtracts the number Nm (504) of sampling points from the count value of the white image in the histogram 410 generated in step S307, as indicated by 421 of FIG. 4. On the other hand, if it is judged in step S308 that original frame erasing is not set for the job setting, the CPU 103 advances the process to step S310 without executing the process in step S309 and directly uses the histogram generated in step S307.

Then, in step S310, the CPU 103 determines, from the histogram generated in step S307 or the histogram on which correction processing is performed in step S309, a threshold when the black-and-white binarization processing is performed. The threshold is determined by the discriminant analysis described with reference to FIG. 4. Subsequently, in step S311, the CPU 103 causes the output image processing unit 113 to perform threshold processing on the read image data by using the threshold calculated in step S310, generates the black-and-white binarized image, and terminates the process. In the threshold processing, letting Din be an input signal value (input pixel value), Dout be an output signal value (output pixel value), and th be the threshold calculated in step S310, a case assumed to be treated by an 8-bit signal will be represented by:

Din≤th, that is, if the pixel value is equal to or smaller than the threshold, the case will be represented by:

Dout=0 Din>th, that is, if the pixel value is larger than the threshold, the case will be represented by:

Dout=255

Note that in density signal values (pixel values) here, 0 indicates white (first value), and 255 indicates black (second value).

Furthermore, according to this embodiment, the compression/decompression processing unit 108 performs compression processing of the binary image after the read image is converted into the black-and-white binary image, and the image data is transmitted onto the LAN 150 or the public line 160 after the CPU 103 makes conversion into the form of transmission data. The transmission may be, for example, facsimile transmission in which the image data is transmitted to an external apparatus. In this embodiment, the description has been given by using the examples in which the thresholds are calculated from the histograms each indicating the density distribution of the original image data. However, the present invention is also applicable to a case in which a histogram indicating a luminance distribution is used.

As described above, the image processing apparatus according to this embodiment performs, based on the job setting, conversion of a pixel value of a partial region in an input original image into a predetermined value on the image data of the original image, as needed. Subsequently, this image processing apparatus generates a histogram representing the density signal distribution of the image data of the original image or the converted image data. Note that if the above-described conversion is performed, this image processing apparatus corrects the generated histogram by subtracting, from the count of the predetermined number of the histogram, the number of sampling points counted in the above-described predetermined region when the histogram is generated. Moreover, this image processing apparatus determines, from the generated histogram or the corrected histogram, a threshold when binarization processing is executed and executes the binarization processing. This makes it possible to, with respect to the read image data, generate a histogram by correcting the influence of a pixel in a region outside the original image and to generate a black-and-white binary image suitable for the original by calculating a threshold.

Note that the present invention is not limited to the above-described embodiment, and various modifications are possible. In the above-described embodiment, the arrangement has been described in which the frame erasing processing is performed by converting, as the frame erasing processing, the image data of the predetermined region in the original image into the first value indicating a white color. However, the present invention is not limited to this and is also applicable to conversion of the predetermined region (may not be the edge portion of the image) in the original image into a predetermined value. The present invention may be applicable to, for example, a process of converting a header region or a footer region into a predetermined value. Alternatively, the predetermined region may be converted into a value (first value) indicating a background color of the original image read with the scanner 120.

In the above-described embodiment, the example in which binarization into the first value indicating the white color and the second value indicating a black color is performed as the binarization processing has also been described. However, the present invention is not intended to limit the first value and the second value, and other values may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-174965 filed on Sep. 7, 2016, which is hereby incorporated by reference herein in its entirety.

What is claimed is:

1. An image processing apparatus comprising:
   at least one memory device that stores a set of instructions; and
   at least one processor that executes the instructions to:
   perform conversion, on image data of an input original image, of pixel values of pixels in a partial region in the original image into predetermined values;
   generate a histogram representing a density signal distribution or a luminance signal distribution of the converted image data;
   correct the generated histogram by subtracting, from a count of the predetermined values of the generated histogram, the number of sampling points counted in the partial region when the histogram is generated;
   determine, from the corrected histogram, a threshold to be used for a binarization processing; and
   binarize the original image by using the determined threshold.

2. The apparatus according to claim 1, wherein the at least one processor further executes the instructions in the at least one memory device to:
   execute frame erasing processing of the original image by converting a pixel in the partial region into a first value indicating a white color.

3. The apparatus according to claim 2, wherein the at least one processor further executes the instructions in the at least one memory device to:
   convert a pixel value not more than the threshold into the first value and convert a pixel value larger than the threshold into a second value indicating a black color in the converted image data.

4. The apparatus according to claim 1, further comprising a reading unit that reads the original image from an original and outputs image data,
   wherein the at least one processor further executes the instructions in the at least one memory device to:
   execute frame erasing processing of the original image by converting a pixel in the partial region into a first value indicating a background color of the original image read by the reading unit.

5. The apparatus according to claim 1, wherein the at least one processor further executes the instructions in the at least one memory device to:
   obtain the number of sampling points in the partial region; and
   subtract the obtained number of sampling points from the count of the predetermined value.

6. The apparatus according to claim 1, wherein the at least one processor further executes the instructions in the at least one memory device to:
   transmit the binarized image data to an external apparatus.

7. The apparatus according to claim 1, wherein the at least one processor further executes the instructions in the at least one memory device to:
   judge, according to a job setting regarding the image data of the input original image, whether to perform the conversion; and
   if it is judged that the conversion is not performed, determine, from the generated histogram, a threshold when the binarization processing is executed.

8. The apparatus according to claim 1, wherein the at least one processor further executes the instructions in the at least one memory device to:
   determine, as a threshold, a pixel value corresponding to a maximum inter-class variance value when the histogram is divided into two classes at a predetermined pixel value.

9. An image processing apparatus comprising:
   at least one memory device that stores a set of instructions; and
   at least one processor that executes the instructions to:
   perform an image processing, on image data of an input original image, of converting pixel values of pixels in a partial region in the original image into predetermined values;
   generate, based on the converted image data, a histogram representing a density signal distribution or a luminance signal distribution of a plurality of pixel values which do not include pixel values of the partial region after the pixel values are converted;
   determine, from the generated histogram, a threshold to be used for a binarization processing; and
   binarize the original image,
   wherein the determined threshold is used for binarizing a part of the converted image data which does not include an image of the partial region.

10. A method for controlling an image processing apparatus, the method comprising:
    performing conversion, on image data of an input original image, of pixel values of pixels in a partial region in the original image into predetermined values;
    generating a histogram representing a density signal distribution or a luminance signal distribution of the converted image data;
    correcting the generated histogram by subtracting, from a count of the predetermined values of the generated histogram, the number of sampling points counted in the partial region when the histogram is generated;
    determining, from the corrected histogram, a threshold to be used for a binarization processing; and
    binarizing the original image by using the determined threshold.

11. A method for controlling an image processing apparatus, the method comprising:
    performing an image processing, on image data of an input original image, of converting pixel values of pixels in a partial region in the original image into predetermined values;
    generating, based on the converted image data, a histogram representing a density signal distribution or a luminance signal distribution of a plurality of pixel values which do not include pixel values of the partial region after the pixel values are converted;
    determining, from the generated histogram, a threshold to be used for a binarization processing; and
    binarizing the original image,
    wherein the determined threshold is used for binarizing a part of the converted image data which does not include an image of the partial region.

12. A non-transitory computer-readable storage medium storing a computer program for causing a computer to execute respective steps in a method for controlling an image processing apparatus, the method comprising:
    performing conversion, on image data of an input original image, of pixel values of pixels in a partial region in the original image into predetermined values;
    generating a histogram representing a density signal distribution or a luminance signal distribution of the converted image data;
    correcting the generated histogram by subtracting, from a count of the predetermined values of the generated histogram, the number of sampling points counted in the partial region when the histogram is generated;
    determining, from the corrected histogram, a threshold to be used for a binarization processing; and
    binarizing the original image by using the determined threshold.

13. A non-transitory computer-readable storage medium storing a computer program for causing a computer to execute respective steps in a method for controlling an image processing apparatus, the method comprising:
    performing an image processing, on image data of an input original image, of converting pixel values of pixels in a partial region in the original image into predetermined values;
    generating, based on the converted image data, a histogram representing a density signal distribution or a luminance signal distribution of a plurality of pixel values which do not include pixel values of the partial region after the pixel values are converted;
    determining, from the generated histogram, a threshold to be used of a binarization processing; and
    binarizing the original image,
    wherein the determined threshold is used for binarizing a part of the converted image data which does not include an image of the partial region.

14. An image processing apparatus comprising:
    at least one memory device that stores a set of instructions; and
    at least one processor that executes the instructions to:
    perform a first image processing to convert a partial region of image data into white on first image data obtained by reading an original with a scanner to generate second image data;
    generate information used for a second image processing by using pixel values in a region which does not include the region converted into white by the first image processing; and
    perform the second image processing which is binarization processing or background image removal processing, by using the generated information on a part of the second image data which does not include an image of the partial region.

15. The apparatus according to claim 14, wherein the information used for the second image processing is information obtained from a histogram generated by using pixel values in the region which does not include the region converted into white.

16. The apparatus according to claim 15, wherein the histogram is a histogram indicating a density distribution or a luminance signal distribution of the region which does not include the region converted into white.

17. The apparatus according to claim 15, wherein the second processing is binarization processing, and the information obtained from the histogram is a threshold when the binarization processing is executed.

18. A method for controlling an image processing apparatus, the method comprising:
   performing a first image processing to convert a partial region of image data into white on first image data obtained by reading an original with a scanner to generate second image data;
   generating information used for a second image processing by using pixel values in a region which does not include the region converted into white by the first image processing; and
   performing the second image processing which is binarization processing or background image removal processing, by using the generated information, on a part of the second image data which does not include an image of the partial region.

* * * * *